INVENTOR.
MARK G. MUND
DALE K. ANDERSON
BY
ATTORNEYS

United States Patent Office 2,887,177
Patented May 19, 1959

2,887,177

AIR CLEANER CONSTRUCTION

Mark G. Mund and Dale K. Anderson, Minneapolis, Minn., assignors to Donaldson Company, Inc., St. Paul, Minn., a corporation of Delaware Application February 18, 1958, Serial No. 715,910

4 Claims. (Cl. 183—34)

Our invention relates generally to air cleaners, and more specifically to air cleaners of the type particularly adapted for use in connection with the air intake systems of internal combustion engines.

More particularly, our invention relates to improvements in such air cleaners which are used under varying conditions of light and heavy dust concentration.

It is well known to those skilled in the art that, when operating internal combustion engines in areas such as dry fields where relatively heavy concentration of dust occurs, the use of a pair of air cleaners in tandem, or a two-stage air cleaner in which the first cleaner element removes the heavy dust particles and the second cleaner element removes the light dust particles from the air stream, is particularly advantageous in that such an arrangement will operate efficiently for a longer period of time without servicing than a cleaner arrangement having a single cleaning element for removing all of the dust. Usually, in such a dual or tandem arrangement, the first cleaner element is of the centrifugal type, the second thereof being in the nature of a filter. However, such arrangements are not necessary in conditions of less heavy dust concentration, and have the slight disadvantage of requiring the second cleaner element or filter to be more dense than if the same were used alone, inasmuch as the first cleaner element tends to reduce the size of the dust particles passing therethrough to the second cleaner element, by abrasion, deagglomeration and the like. Inasmuch as air cleaners of the type set forth are usually mounted on vehicle engines by means including bolts or screws, requiring the use of wrenches, screw-drivers or the like, an operator is usually reluctant to remove one type of air cleaner from the vehicle engine and replace the same with another type more suitable to the prevailing dust conditions so that, in many instances, less than the most efficient type of air cleaner is in use for a given dust condition. Usually, present day air cleaners are designed as a compromise to operate fairly well under conditions of both high and low dust concentration.

An important object of our invention is the provision of an air cleaner having primary and secondary air-dust separating means, and a novel arrangement whereby one or the other thereof may be quickly and easily removed or replaced, without the use of tools, to provide for maximum cleaning efficiency for any condition of high or low dust concentration.

Another object of our invention is the provision of an air cleaner of the type set forth comprising a plurality of sections, one of which is secured to the air intake system of an engine, and another of which is releasably secured to said one thereof for quick and easy removal therefrom or re-attachment thereto, said other one of said sections including a primary air-dust separator, said one thereof including a secondary air-dust separator whereby, under operating conditions of low dust concentration, only the secondary air-dust separator need be utilized.

Another object of our invention is the provision of an air cleaner having a top end section adapted to be connected to the air intake system of an engine, an intermediate section, and a cup-like bottom end section, said intermediate section including a primary air-dust separator, said top end section including a secondary air-dust separator, the bottom end section being adapted to have sealing engagement with the bottom end of a selected one of the top end and intermediate sections, whereby the bottom end section provides a dust collecting chamber for the primary air-dust separator or, when the intermediate section is not used, defines conduit means between the inlet portion of the top end section and an inlet passage in one of said end sections.

It is further well known that space within engine compartments is usually quite restricted, and that disassembly of air cleaners for servicing and reassembly thereof is required to be performed in such a generally restricted space. Another highly important object of our invention, is therefore, the provision of an air cleaner of the type set forth including a removable secondary air-dust separator in the top end section thereof, the secondary air-dust separator being removable downwardly from the top end section when the intermediate and bottom end sections are disassociated from the top end section, said secondary air-dust separator being of an axial length less than the combined overall length of said intermediate and bottom end sections plus the clearance dimension below the bottom end section necessary for removal of said intermediate and bottom end sections from the top end section, whereby less space below the top end section is needed to remove the secondary air-dust separator from the lower end thereof than that required for removal of the intermediate and bottom end sections.

The above, and still further highly important objects and advantages of our invention will become apparent from the following detailed specification, appended claims, and attached drawings.

Referring to the drawings, which illustrate the invention, and in which like reference characters indicate like parts throughout the several views.

Figure 1:
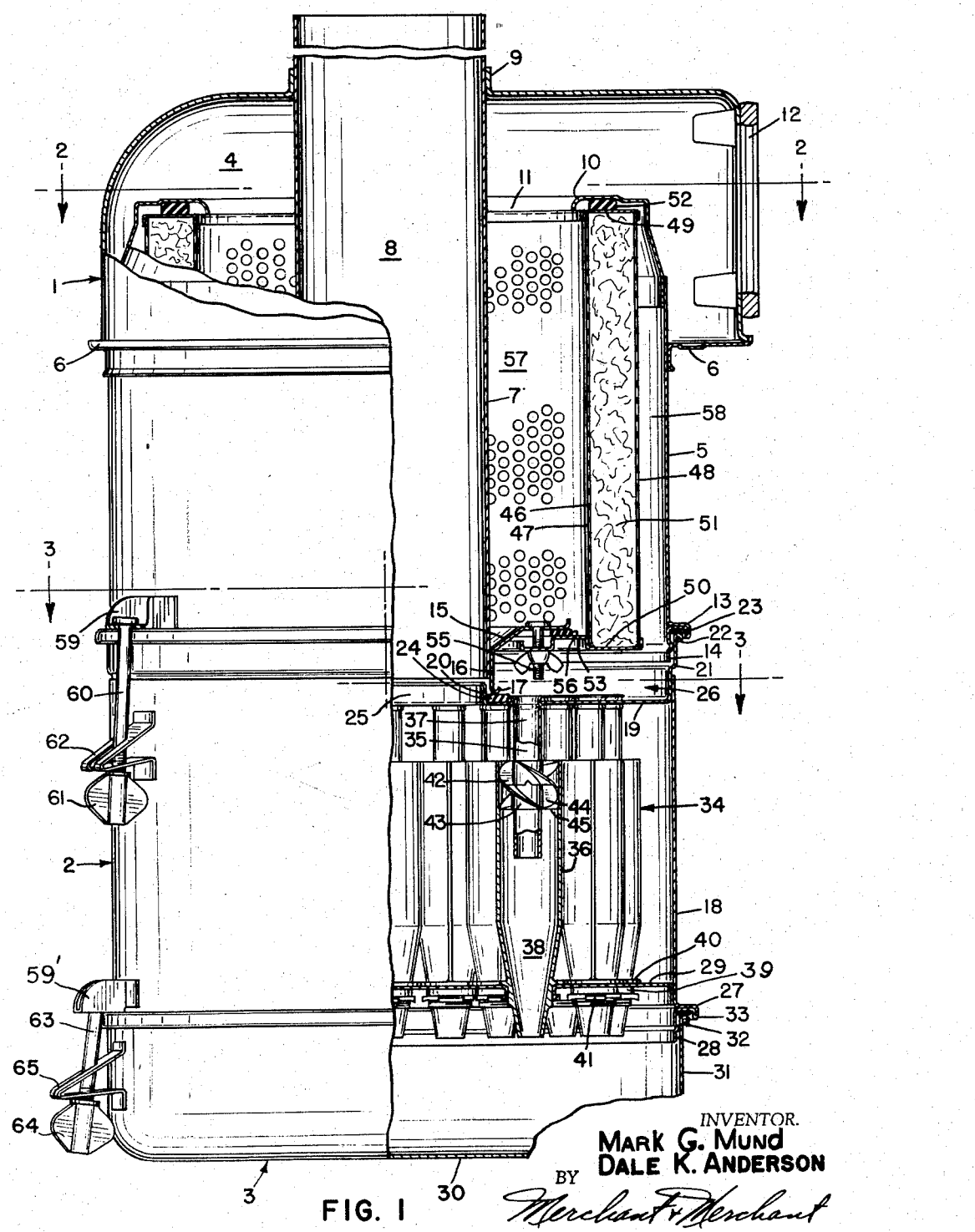
Fig. 1 is a view in side elevation of our improved air cleaner, some parts being broken away, and some parts being shown in axial section.

In the preferred embodiment of our invention illustrated, a so-called "dry type" air cleaner is shown in the drawing as comprising, a top end section indicated in its entirety by the numeral 1, an intermediate section indicated in its entirety by the numeral 2, and a bottom end section indicated in its entirety by the numeral 3. The top, intermediate and bottom sections are releasably secured together in superimposed relationship by suitable means hereinafter to be described. The top end section 1 includes an inverted generally cup-shaped end member 4, a cylindrical outer wall 5 that is rigidly secured to the end member 4 by means of a generally annular flanged member 6, and an inlet tube 7 concentric with the cylindrical wall 5 and defining an axial air inlet passage 8. The inlet tube 7, at its upper end portion, is welded or otherwise rigidly secured to a circumferential flange 9 in the end member 4, and extends downwardly therefrom in concentric relation to an annular baffle 10 at the upper end of the cylindrical wall 5, said tube 7 and baffle 10 defining an annular opening 11 for passage of air therethrough to a discharge opening 12 at one side of the top member 4. Adjacent its lower end, the outer cylindrical wall 5 is formed to provide a circumferential stop flange 13 and a cylindrical skirt 14 depending therefrom. The lower end of the inlet tube 7 has welded or otherwise rigidly secured thereto a mounting ring 15 that is formed to provide an axial tubular portion 16 which extends below the level of the bottom of the skirt 14, and which at its lower end is formed to provide a stop bead or flange 17.

The intermediate section 2 includes a cylindrical wall 18 of substantially the same diameter as that of the outer wall 5, and to the upper end portion of which is welded or otherwise rigidly secured an annular partition element 19, having inner and outer cylindrical portions 20 and 21 respectively, the former being axially aligned with the air inlet passage 8, the latter snugly telescopically receiving the cylindrical skirt 14 and terminating at its upper marginal edge in a rolled bead 22 which makes sealing engagement with a gasket 23 interposed therebetween and the stop flange 13. Sealing engagement is had between the inner marginal portion of the partition element 19 and the stop bead 17 by a soft rubber-like sealing washer 24 which encompasses the inner cylindrical portion 20. The inner cylindrical portion 20 of the partition 19 defines an air inlet 25 communicating with the air inlet passage 8, said partition 19 and the outer cylindrical portion 21 thereof defining the air outlet of said intermediate section 2, said air outlet being identified at 26. The cylindrical wall 18, at its lower end portion, is formed to provide a circumferential stop flange 27 identical in size and shape to the stop flange 13, and a depending cylindrical skirt 28 identical in size and shape to the skirt 14 of the cleaner section 1. A lower partition element 29 provides a closure for the lower end portion of the intermediate section 2, said lower partition element being welded or otherwise rigidly secured to the inner surface of the cylindrical wall 18 closely above the stop flange 27 thereof.

The bottom end section 3 is formed to provide an imperforate bottom wall 30 and a cylindrical wall 31 which terminates at its upper marginal edge in a rolled bead 32, the wall 31 and bead 32 being identical in diameter and arrangement to the upper marginal edge portion 21—22 of the partition element 19 of the intermediate section 2. Hence, the bottom end section 3 is adapted to be mounted on and having sealing engagement with the lower end of the top end section 1 or the intermediate section 2 selectively. An annular gasket 33, identical to the gasket 23, is interposed between the stop flange 27 and the bead 32 to render the connection therebetween air tight. It will be noted that the vertical distance between the bead 32 and the bottom wall 30 of the bottom end section 3 is greater than that between the bead 22 and its partition element 19, so that, when the intermediate section 2 is removed from operative engagement with the top end section 1 and the bottom end section 3 is moved into operative engagement directly with the lower end of the top end section 1, the bottom wall 30 of the bottom end section 3 will be disposed in downwardly spaced relation to the stop bead 17 of the inlet tube 7. When the bottom end section 3 is thus disposed, the same defines a direct conduit between the inlet passage 8 and the interior of the top section 1 between the inlet tube 7 and the outer cylindrical wall 5, as will be hereinafter more fully described.

The intermediate section 2 includes a plurality of primary air-dust separators 34 each comprising inner and outer concentric tubes 35 and 36 respectively, the former of which extend upwardly through and are rigidly secured to the partition element 19, whereby to define air passage means 37. The outer tubes 36 terminate at their upper ends in downwardly spaced relation to the partition 19, and are provided with downwardly tapering lower end portions 38 which extend downwardly through openings in the lower partition element 29, said openings being defined by tubular flanges 39 integrally formed with the partition element 29. The tapered portion 38 of each tube 36 is provided with a radially outwardly projecting annular flange 40 which rests on the partition element 29, and is further screw threaded to receive an anchoring nut 41 which engages the lower end of its respective tubular flange 39. Each inner tube 35 terminates at its lower end between the upper end of its respective outer tube 36 and the tapered portion 38 thereof, and has interposed therebetween and the upper end portion of its respective outer tube 36 a helical guide element 42 which causes the dust laden air entering the upper end of the tube 36 to travel in a circular path as it moves downwardly through the tube 36. The heavier dust particles entrained in the air are thrown laterally outwardly by centrifugal force and are caused to move downwardly under action of gravity and centrifugal force to the lower tapered portion 38 from whence the dust drops into the cup-like bottom end section 3, while the air in the tube 36 moves inwardly and upwardly through the inner tube 35 to the air outlet 26. The air being discharged upwardly through the passage means 37 carries with it only a small percentage of the dust particles, these particles being of relatively small size and light weight insufficient to cause the same to be discharged downwardly into the bottom end section 3. Each guide element 42 comprises a central tubular sleeve 43 snugly received on its respective inner tube 35, and a plurality of helical vanes 44 which are snugly received in the upper end portion of their respective outer tube 36. Each tube 36 is formed to provide an annular shoulder 45 that engages the lower end portions of the vanes 44 to positively limit downward movement of the guide elements 42.

The top end section 1 includes a secondary air-dust separator in the nature of a tubular filter 46 having concentric inner and outer perforate walls 47 and 48 respectively and annular end walls 49 and 50, the space between said walls being filled with suitable dry filter medium, indicated at 51. An annular rubber-like sealing washer 52 is interposed between the annular baffle 10 radially outwardly of the opening 11 therein and the upper end wall 49 of the tubular filter 46. The lower annular end wall 50 of the secondary air-dust separator 46 is formed to provide an annular retaining portion 53 having suitable circumferentially spaced openings, not shown, for reception of a plurality of circumferentially spaced wing nut equipped studs 55 that are welded or otherwise rigidly secured to the mounting ring 15 and which extend downwardly therefrom. For the purpose of providing an air tight seal between the mounting ring 15 and the retaining portion 53, we provide an annular sealing washer 56 preferably made from soft rubber or the like, and disposed between over-lapping flat portions of the mounting ring 15 and retaining portion 53 of the end wall 50 radially inwardly of the inner cylindrical wall 47.

The inlet tube 7 and inner wall 47 of the filter 46 define an outlet chamber 57 which communicates with the discharge opening 12 through the baffle opening 11 and the interior of the end member 4. The outer wall 5 of the top end section 1 and the outer wall 48 of the filter 46 cooperate to define an inlet chamber 58 the lower end of which communicates with the air outlet 26 of the intermediate section 2. The filter medium 51 is preferably composed of relatively fine closely matted cellulose or synthetic fibers in a dry state, such as paper or the like. In any event, the secondary air-dust separator separates out of the air stream any finer lighter dust particles carried thereto from the primary air-dust separator 34, so that clean dust free air enters the air intake system of an engine through the discharge opening 12 of the air cleaner.

For the purpose of releasably locking the intermediate section 2 to the top end section 1, we provide circumferentially spaced pairs of diametrically opposed brackets 59 that are welded or otherwise rigidly secured to the outer wall 5 immediately above the stop flange 13, and from which loosely depend headed bolts 60 on the lower ends of which are screw threaded wing nuts 61. Each of the bolts 60 is adapted to be received by a different one of a plurality of bifurcated clips 62 that are welded or otherwise rigidly secured to the cylindrical wall 18 of the intermediate section 2, each of the clips 62 underlying a different one of the brackets 59. The bottom end section 3 is releasably locked to the lower end of the intermediate section 2 in like manner, a pair of brackets 59', identical to the brackets 59 being secured to the cylindrical wall 18 of the intermediate section 2 immediately above the stop flange 27 in diametrically opposed relationship. Clamping bolts 63, similar to the bolts 60 depend loosely from the brackets 59' and are equipped with wing nuts 64 and are adapted to be received in bifurcated clips 65 identical to the clips 62, the clips 65 being welded or otherwise anchored to the cylindrical wall 31 of the bottom end section 3 in diametrically opposed relationship.

Figure 2:
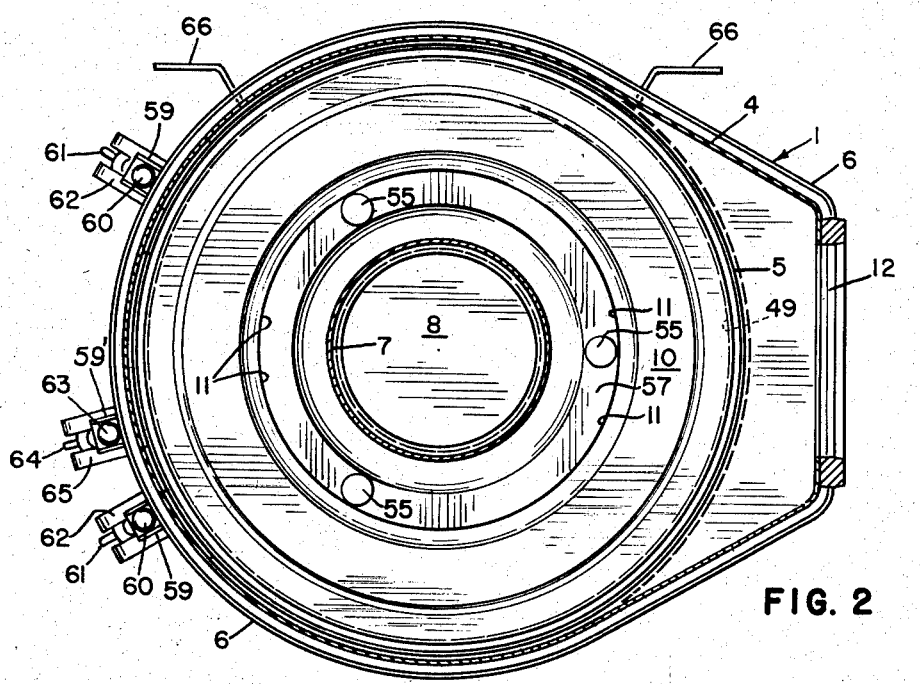
Fig. 2 is a horizontal section taken substantially on the line 2—2 of Fig. 1.
Figure 3:
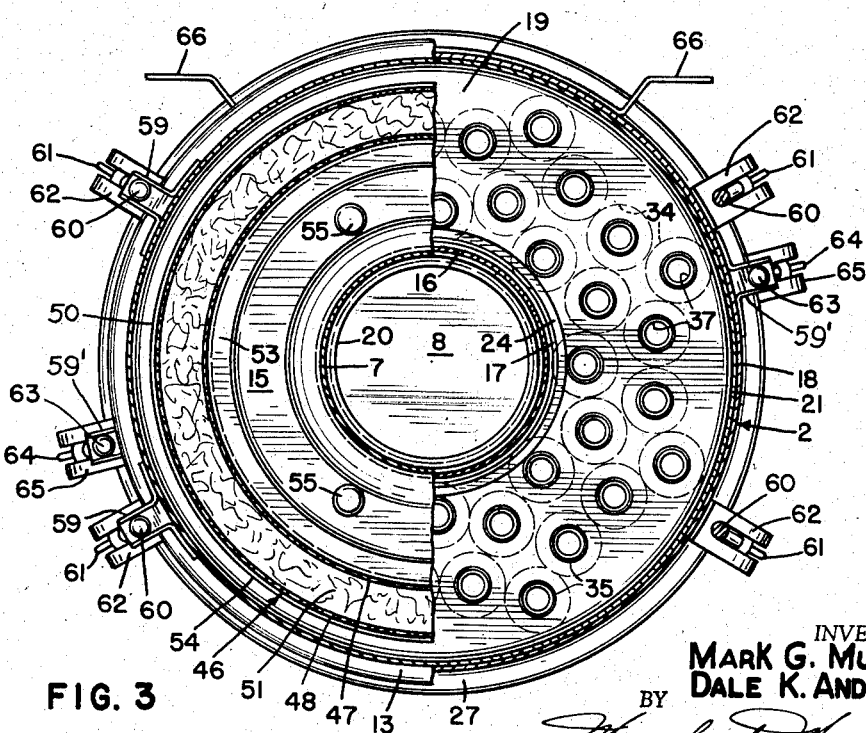
Fig. 3 is a horizontal section taken substantially on the irregular line 3—3 of Fig. 1.

In view of the fact that the intermediate section 2 and bottom end section 3 are removable from the top end section 1, and that the discharge portion of the cleaner is in the top end section 1 and more or less permanently secured to the air intake of an engine, we provide a mounting bracket 66 by means of which the top end section 1 may be rigidly secured to the engine or any part of the vehicle which carries the engine. The bracket 66 is welded or otherwise rigidly secured to the outer surface of the wall 5, see Fig. 2.

When the instant air cleaner is being utilized to separate dust from air in operating conditions of relatively high dust concentration, all of the cleaner sections 1, 2 and 3 are employed, as illustrated in Fig. 1. When thus arranged, dust laden air is drawn downwardly through the inlet passage 8 and air inlet 25 into the primary air-dust separators 34. The heavier dust particles are separated from the air stream within the outer tubes 36 of the separators 34, by vortex action, and settle to the bottom of the cup-like bottom end section 3 through the dust outlet means defined by the tapering walls 38 of the primary separators. The air within the tube 36 changes direction and moves upwardly through the passage means 37 to the air outlet 26, carrying with it only the smaller light dust particles which were not separated out in the separators 34. From thence, the air travels upwardly and radially inwardly through the secondary separator 46 wherein substantially all of the dust particles are retained, the clean air moving upwardly through the opening 11 in the baffle 10 and outwardly through the discharge opening 12 to the engine, not shown.

As above indicated, under operating conditions of low dust concentration, it is not necessary that the primary air dust separator be used. Under such operating conditions, the intermediate section 2 is removed from the top end section 1 and the bottom end section 3 is applied directly to the lower end of the top end section 1, the diametrically opposed clips 65 of the bottom end section 3 being utilized to receive a given diametrically opposed pair of the wing nut equipped clamping screws or bolts 60 to lock the bottom end section in place. With this arrangement, the marginal bead 32 of the bottom end section 3 makes sealing contact with the gasket 23 underlying the stop flange 13. The bottom end section 3 now defines a conduit between the lower end of the air inlet passage 8 and the inlet portion of the inlet chamber 58, and only the secondary separator or filter 46 is utilized to separate the dust from the air stream moving through the cleaner to the discharge opening 12 thereof. With the above described arrangement, it is a simple matter for the operator to remove or replace the intermediate section 2 when operating conditions warrant such removal or replacement. It will be borne in mind that the longitudinal dimension of our air cleaner is such that, in the original installation, sufficient clearance below the cleaner is maintained to permit downward movement of the intermediate and bottom end sections 2 and 3 respectively to the extent that they may be entirely disengaged from the top end section 1 and removed from the engine compartment.

Although the air-dust separators 34 of the intermediate section 2 separate most of the dust from the air stream, it is necessary to periodically remove the secondary separator or filter 46 for cleaning or replacement. This is accomplished, after the intermediate section 2 and the bottom end section 3 have been removed from the top end section 1, by unscrewing the wing nuts from the studs 55 to permit the tubular filter 46 to drop from the interior of the top end section 1 under action of gravity. Preferably, and as shown, the axial length of the tubular filter 46 is not substantially greater than the axial length of the intermediate section 2 plus the axial length of the bottom end section 3. Hence, removal of the secondary separator or filter 46 and replacement thereof is achieved without requiring more space below the cleaner in an engine compartment than is required for removal and replacement of the intermediate section 2 and bottom end section 3 separately or together. It will be further noted that, should the secondary air-dust separator 46 be damaged in cleaning, or otherwise rendered incapable of performing its function, the same may be omitted from the interior of the top end section 1, and the primary air-dust separator 34 alone be utilized to separate dust from the air stream moving through the cleaner. This is more or less an emergency measure, but should suffice until the secondary filter 46 is replaced.

While we have shown and described a commercial embodiment of our novel air cleaner, it will be understood that the same is capable of modification without departure from the spirit and scope of the invention, as defined in the claims.

What we claim is:

1. An air cleaner comprising top and bottom end sections and an intermediate section, said intermediate section having an air inlet and an air outlet and including a primary air-dust separator interposed between said inlet and outlet, an air inlet passage in one of said end sections communicating with said inlet of the intermediate section, said top end section having a clean air discharge opening and an inlet portion spaced therefrom and in communication with the air outlet of said intermediate section and including a secondary air-dust separator interposed between said inlet portion and discharge opening, said top and intermediate sections having cooperating lower and upper marginal edge portions respectively in sealing engagement with each other, said intermediate section having a lower marginal edge portion substantially identical to the lower marginal edge portion of said top end section, said bottom end section having an upper marginal edge portion substantially identical to the upper marginal edge portion of said intermediate section, whereby the upper marginal edge portion of said bottom end section is adapted to have sealing engagement with the lower marginal edge portion of a selected one of said top end or intermediate sections, and means for releasably locking said top end section and intermediate section and bottom end section in superimposed relationship or for releasably and selectively locking said bottom end section to the lower end of said top end section wherein said bottom end section defines a direct conduit between said inlet passage and the inlet portion of said top end section.

2. An air cleaner comprising superimposed top and intermediate sections and a closure-forming bottom section, said intermediate section having an air inlet and an air outlet at its upper end and including a primary air-dust separator interposed between said inlet and outlet, an air inlet passage in said top section communicating with said inlet of the intermediate section, said top section having a clean air discharge opening and an inlet portion spaced therefrom and in communication with the air outlet of said intermediate section and including a secondary air-dust separator interposed between said inlet portion and discharge opening, said top and intermediate sections having cooperating lower and upper marginal edge portions respectively in sealing engagement with each other, said intermediate section having a lower marginal edge portion substantially identical to the lower marginal edge portion of said top section, said bottom section having an upper marginal edge portion substantially identical to the upper marginal edge portion of said intermediate section, whereby the upper marginal edge portion of said bottom section is adapted to have sealing engagement with the lower marginal edge portion of a selected one of said top or intermediate sections, and means for releasably locking said top and intermediate and bottom sections in superimposed relationship or for releasably and selectively locking said bottom section to the lower end of said top section wherein said bottom section defines a direct conduit between said inlet passage and the inlet portion of said top section.

3. An air cleaner comprising superimposed top and intermediate sections and a cup-like closure-forming bottom section, said intermediate section having an axial air inlet and an air outlet at the upper end thereof, said air outlet being disposed radially outwardly of said axial air inlet, said intermediate section including a primary air-dust separator interposed between said air inlet and air outlet, an axial air inlet passage in said top section communicating with said air inlet of the intermediate section, said top casing section having a clean air discharge opening and an inlet portion spaced therefrom and in communication with said air outlet of the intermediate section and including a secondary air-dust separator interposed between said inlet portion and said discharge opening, said top and intermediate sections having cooperating lower and upper marginal edge portions respectively in sealing engagement with each other, said intermediate section having a lower marginal edge portion substantially identical to the lower marginal edge portion of said top section, said bottom section having an upper marginal edge portion substantially identical to the upper marginal edge portion of said intermediate section, whereby the upper marginal edge portion of said bottom section is adapted to have sealing engagement with the lower marginal edge portion of a selected one of said top or intermediate sections, and means for releasably locking said top and intermediate and bottom sections in superimposed relationship or for releasably and selectively locking said bottom section to the lower end of said top section wherein said bottom section defines a direct conduit between said inlet passage and the inlet portion of said top section.

4. An air cleaner comprising superimposed generally cylindrical top and intermediate sections and a generally cylindrical cup-like closure-forming bottom section, said intermediate section having an air inlet and an air outlet at its upper end and including a primary air-dust separator interposed between said inlet and outlet, an air inlet passage in said top section communicating with said inlet of the intermediate section, said top section having a clean air discharge opening and an inlet portion spaced therefrom and in communication with the air outlet of said intermediate section and including a generally cylindrical casing wall defining a separator chamber and a secondary air-dust separator removable from said chamber through said inlet portion, means for releasably locking said secondary air-dust separator within said chamber between said inlet portion and discharge opening, the casing wall of said top section and said intermediate section having cooperating lower and upper marginal edge portions respectively in sealing engagement with each other, said intermediate section having a lower marginal edge portion substantially identical to the lower marginal edge portion of said top section, said bottom section having an upper marginal edge portion substantially identical to the upper marginal edge portion of said intermediate section, whereby the upper marginal edge portion of said bottom section is adapted to have sealing engagement with the lower marginal edge portion of a selected one of said top or intermediate sections, and means for releasably locking said top and intermediate and bottom sections in superimposed relationship or for releasably and selectively locking said bottom section to the lower end of said top section wherein said bottom section defines a direct conduit between said inlet passages and the inlet portion of said top section, the axial length of said secondary air-dust separator being not substantially greater than the axial length of said intermediate section plus the axial length of said bottom end section, whereby removal of said secondary air-dust separator downwardly from said top section requires a maximum space below said top section not greater than that required for removal of said intermediate and bottom sections together.

References Cited in the file of this patent

UNITED STATES PATENTS

| | | |
|---|---|---|
| 1,423,412 | Garner | July 18, 1922 |
| 1,575,292 | Tyler | Mar. 2, 1926 |
| 1,851,427 | Hinkle | Mar. 29, 1932 |
| 2,251,790 | Hallerberg | Aug. 5, 1941 |
| 2,295,984 | Wilson | Sept. 15, 1942 |
| 2,490,959 | Gregory | Dec. 13, 1949 |
| 2,519,897 | Framer | Aug. 22, 1950 |